(12) United States Patent
Brown et al.

(10) Patent No.: US 10,171,424 B2
(45) Date of Patent: Jan. 1, 2019

(54) PRIVACY ENHANCING NETWORKS

(71) Applicant: MindTop, Inc., Melrose, MA (US)

(72) Inventors: Michael Brown, Melrose, MA (US); Rajendar Duggal, Lincoln, MA (US)

(73) Assignee: MINDTOP, INC., Melrose, MA (US)

( * ) Notice: Subject to any disclaimer, the term of this patent is extended or adjusted under 35 U.S.C. 154(b) by 195 days.

(21) Appl. No.: 15/380,320

(22) Filed: Dec. 15, 2016

(65) Prior Publication Data

US 2017/0171154 A1   Jun. 15, 2017

Related U.S. Application Data

(60) Provisional application No. 62/267,411, filed on Dec. 15, 2015.

(51) Int. Cl.
  *H04L 29/06* (2006.01)
  *H04L 12/46* (2006.01)
  (Continued)

(52) U.S. Cl.
  CPC ...... *H04L 63/0254* (2013.01); *H04L 12/4641* (2013.01); *H04L 43/10* (2013.01);
  (Continued)

(58) Field of Classification Search
  CPC ... H04L 12/4641; H04L 67/02; H04L 65/102; H04L 63/0281; H04L 63/0254;
  (Continued)

(56) References Cited

U.S. PATENT DOCUMENTS

2003/0046400 A1   3/2003   Friel et al.
2005/0073998 A1*  4/2005   Zhu .................. H04L 29/06027
                                                       370/352
(Continued)

FOREIGN PATENT DOCUMENTS

WO    WO-2015131943 A1    9/2015

OTHER PUBLICATIONS

International Search Report and Written Opinion issued by the U.S. Patent and Trademark Office as International Searching Authority, issued in PCT/US16/66917, dated Apr. 12, 2017 (20 pages).
(Continued)

*Primary Examiner* — Tri M Tran
(74) *Attorney, Agent, or Firm* — Wilmer Cutler Pickering Hale and Dorr LLP

(57) ABSTRACT

The presently disclosed privacy enhancing networks (PENs) comprises a network of gateways in communication with one or more controllers. By dynamically creating and tearing down unique data flow paths through a network of gateways for each individual data flow, the privacy enhancing network makes it more difficult for an adversary to glean information about communicating parties. Since each flow in a single data session may be routed through a different path, adversaries may find it more difficult to determine which data flows are associated with each data session. This in turn, makes it more difficult for adversaries to gather enough data traffic to break any encryption applied to the data flows. Furthermore, since each flow in a single data session can be directed along a different path, a privacy enhancing network may make it difficult for adversaries to even determine that the communicating parties are communicating at all.

25 Claims, 12 Drawing Sheets

(51) Int. Cl.
*H04L 12/26* (2006.01)
*H04L 29/08* (2006.01)

(52) U.S. Cl.
CPC ...... *H04L 63/0209* (2013.01); *H04L 63/0281* (2013.01); *H04L 63/0407* (2013.01); *H04L 65/102* (2013.01); *H04L 67/02* (2013.01); *H04L 63/08* (2013.01); *H04L 67/42* (2013.01)

(58) Field of Classification Search
CPC ..... H04L 63/0209; H04L 43/10; H04L 67/42; H04L 63/0407; H04L 63/08
See application file for complete search history.

(56) References Cited

U.S. PATENT DOCUMENTS

| | | |
|---|---|---|
| 2006/0002382 A1 | 1/2006 | Cohn |
| 2006/0174006 A1 | 8/2006 | Hallenstal et al. |
| 2008/0310312 A1 | 12/2008 | Acharya et al. |
| 2011/0058563 A1 | 3/2011 | Saraph et al. |
| 2014/0064082 A1 | 3/2014 | Yeung et al. |
| 2015/0003240 A1* | 1/2015 | Drwiega ............. H04L 65/1069 370/230 |
| 2015/0016340 A1 | 1/2015 | Itoh et al. |

OTHER PUBLICATIONS

Mimoso, Michael, "Judge Confirms DOD Funded Research to Decloak TOR Users," retrieved online from URL<https://threatpost.com/judge-confirms-dod-funded-research-to-decloak-tor-users/116464, Feb. 25, 2016, 4 pages (retrieved on Apr. 17, 2017).

* cited by examiner

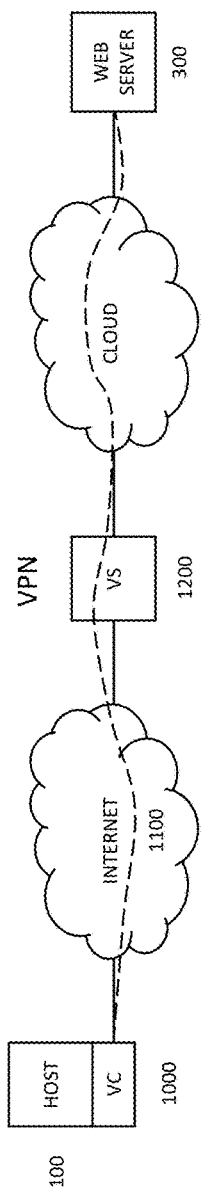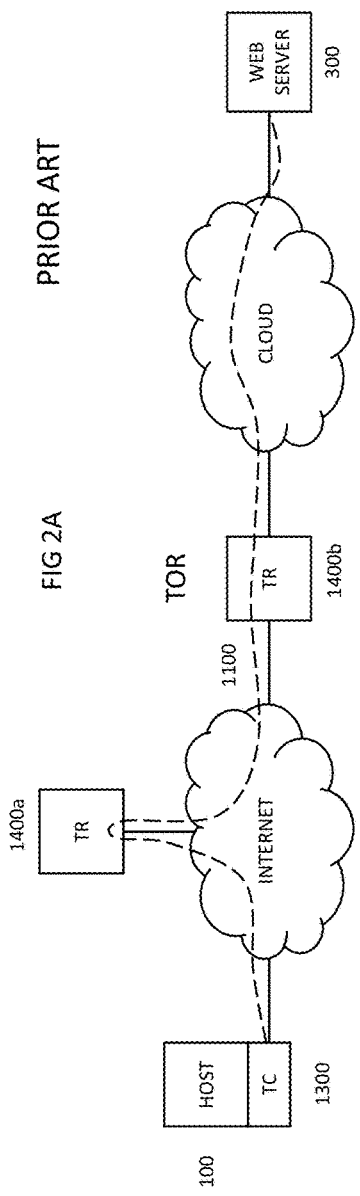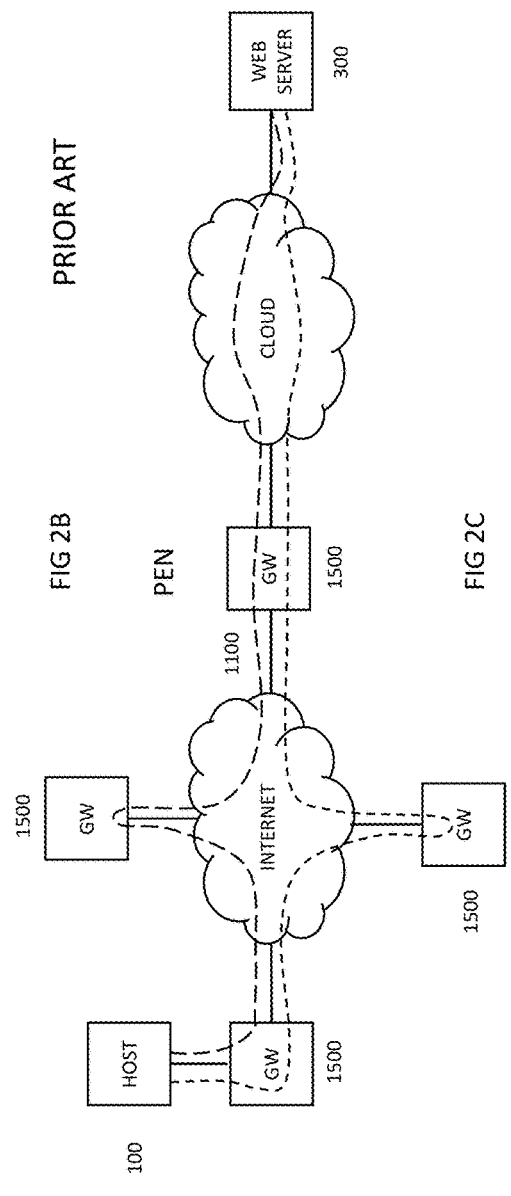

PRIVACY ENHANCING NETWORKS

RELATED APPLICATIONS

This application claims priority to U.S. Provisional Application No. 62/267411 titled "Privacy Enhanced Networks" filed on 15 Dec. 2015, the entire contents of which are incorporated herein by reference.

FIELD

The subject matter disclosed in this application generally relates to computing and communications systems and, more specifically, to systems that employ endpoint and traffic obfuscation techniques to provide secure computer-to-computer communications (i.e. networking) services in a transparent, scalable and flexible manner.

BACKGROUND

Government sponsored organizations (GSOs), hackers and cybercriminals adversaries) use various tracking techniques to locate, identify and assess targets of interest. One widely used technique is traffic flow analysis (TFA).

Adversaries use TFA to gather metadata regarding communications between parties. In computer communications this metadata includes source addresses, destination addresses, source ports, destination ports, time of day, duration and the quantity of data or traffic flows in communication sessions. With these metadata, adversaries can infer the relationships, activities and identities of communicating parties.

Adversaries typically collect this information directly from carrier networking equipment or by surreptitiously placing monitoring equipment at key locations in networks (i.e. tapping). Prime tapping locations include the 24 or so major Internet Exchange Points (IXPs) around the world.

SUMMARY

According to various aspects, the present disclosure is directed to privacy enhancing networks.

According to one aspect, the present disclosure is directed to a method for obscuring data flow paths and/or the identities of the endpoints of these paths through a network of gateways, the method comprising: providing a controller in communication with each gateway in the network of gateways; receiving, at the controller, a request for a flow path through the network of gateways from an originating gateway to a destination gateway; computing, by the controller in response to the request, a unique flow path comprising a sequence of intervening gateways between the originating gateway and the destination gateway; and sending, from the controller to each intervening gateway in the computed flow path, flow transformation information to enable each intervening gateway to forward received data traffic to the next intervening gateway in the sequence.

In some embodiments, the unique flow path can comprise a random sequence of intervening gateways.

In some embodiments, the unique flow path can be computed based on a set of weights assigned to each gateway in the network of gateways.

In some embodiments, the set of weights can indicate the relative load being processed by each respective gateway in the network of gateways, In some embodiments, the set of weights can also reflect a relative preference for available gateway resources.

In some embodiments, the request can be associated with a data flow from a single port at a single source address to a single destination port at a single destination address.

In some embodiments, the flow transformation information sent to a particular intervening gateway in the sequence of intervening gateways can comprise: a flow ID associated with the data flow; and information identifying a next intervening gateway in the sequence.

In some embodiments, the method can further comprise authenticating, by the controller, at least some of the gateways in the network of gateways.

In some embodiments, the method can further comprise authenticating the controller by at least one gateway in the network of gateways.

In some embodiments, the controller can only send information pertaining to a subset of the entire sequence of intervening gateways to any single gateway.

In some embodiments, the request can be associated with a single data flow of a data session, and wherein the data session comprises a plurality of other data flows, the method further comprising computing, by the controller, different flow paths for each of the other data flows.

In some embodiments, the method can further comprise splitting a single, original data flow into multiple micro-flows, wherein the request is associated with a single micro-flow, and wherein the method further comprises computing, by the controller, different flow paths for each of the other micro-flows.

In another aspect, the present disclosure is directed to a controller for obscuring data flow paths through a network of gateways, the controller comprising: a network interface for enabling communication with each gateway in the network of gateways; a processor configured to: receive, via the network interface, a request for a flow path through the network of gateways from an originating gateway to a destination gateway; compute, in response to the request, a unique flow path comprising a sequence of intervening gateways between the originating gateway and the destination gateway; and send, via the network interface to each intervening gateway in the computed flow path, flow transformation information to enable each intervening gateway to forward received data traffic to the next intervening gateway in the sequence.

In some embodiments, the controller can be further configured to store information regarding the computed flow path in a list of active paths; receive, via the network interface, a request from a gateway of the network of gateways to delete the information; and delete, in response to the request, the information from the list of active paths.

In some embodiments, the controller can be further configured to receive, via the network interface, aggregate and per-flow traffic statistics from each gateway in the network of gateways.

In some embodiments, the controller can be configured to compute the unique flow path based at least in part on the received aggregate and per-flow traffic statistics.

In some embodiments, the controller canbeconfigured to employ a policy database, and a set of rules within the database, to decide whether a flow path should be computed.

In another aspect, the present disclosure is directed at a method for obscuring data flow paths through a network of gateways, the method comprising: receiving at a first gateway data traffic associated with a flow ID; searching a table of flow ID transformations (FITs) for a FIT that corresponds to the flow ID; when there is a corresponding FIT, forwarding the received data traffic from the first gateway to a subsequent gateway indicated by the corresponding FIT; and when there is no corresponding FIT: sending, from the first gateway to a controller, a request for a flow path associated with the flow ID through the network of gateways to a destination gateway, and receiving from the controller, at the first gateway and at each respective gateway along a sequence of intervening gateways between the first gateway and the destination gateway, flow transformation information that enables the first gateway and each intervening gateway to forward received data traffic associated with the flow ID to the next intervening gateway in the sequence, wherein the sequence of intervening gateways is unique to the flow ID.

In some embodiments, the method can further comprise: when there is no corresponding FIT: buffering the received data traffic at the first gateway; after receiving, from the controller, the flow transformation information at the first gateway, releasing the buffered traffic at the first gateway by sending it to the next intervening gateway in the sequence of intervening gateways.

In some embodiments, the method can further comprise computing, by the controller in response to the request for the flow path from the first gateway, a flow path comprising the sequence of intervening gateways.

In some embodiments, the method can further comprise sending the data traffic received at the first gateway to the destination gateway via the sequence of intervening gateways between the first gateway and the destination gateway.

In some embodiments, the flow ID can be associated with a single data flow of a data session, and wherein the data session comprises a plurality of other data flows, each associated with different flow IDs.

In another aspect, the present disclosure is directed at a system for obscuring data flow paths, the system comprising: a network of gateways, including an originating gateway and a destination gateway; and a controller in communication with each gateway in the network of gateways; wherein the originating gateway is configured to send to the controller a request for a flow path through the network of gateways from the originating gateway to the destination gateway; wherein the controller is configured to: compute, in response to the request, a unique flow path comprising a sequence of intervening gateways between the originating gateway and the destination gateway, and send, to each intervening gateway in the computed flow path, flow transformation information to enable each intervening gateway to forward received data traffic to the next intervening gateway in the sequence; and wherein each intervening gateway in the computed flow path is configured to, upon receiving the flow transformation information from the controller, transfer data traffic from the originating gateway to the destination gateway by forwarding it along each intervening gateway in the sequence.

In some embodiments, each intervening gateway in the computed flow path can be configured to gather network traffic statistics and to send the network traffic statistics to controller, and wherein the controller is configured to compute the unique flow path based at least in part on the network traffic statistics.

In some embodiments, the request for the flow path can be associated with a simulated traffic flow generated by the originating gateway.

In some embodiments, the originating gateway canbeconfigured to direct the simulated. traffic flow at a network node hosting a network service or application in order to stress test the network node.

In another aspect, the present disclosure is directed at a system for obscuring data flow paths, the system comprising: a network of gateways including an originating gateway and a destination gateway; and a controller in communication with each gateway in the network of gateways; wherein the originating gateway is configured to split an original data flow into a plurality of micro-flows, and to send to the controller, for each micro-flow, a separate request for a different flow path through the network of gateways from the originating gateway to the destination gateway; wherein the controller is configured to: compute, in response to each request, a unique flow path for each micro-flow, the unique flow path comprising a sequence of intervening gateways between the originating gateway and the destination gateway, and for each respective computed flow path: send, to each intervening gateway in the respective computed flow path, flow transformation information to enable each intervening gateway to forward received data traffic to the next intervening gateway in the sequence corresponding to the respective flow path; and wherein the destination gateway is configured to re-assemble micro-flows into the original data flow.

BRIEF DESCRIPTION OF THE DRAWINGS

FIG. 2A is a conceptual block diagram illustrating a prior known system that uses a Virtual Private Network (VPN) to protect data traffic flows.

FIG. 2B is a conceptual block diagram illustrating a prior known system that uses The Onion Router (TOR) to protect data traffic flows.

FIG. 2C is a conceptual block diagram illustrating a system that uses a Privacy Enhanced Network (PEN) to protect data traffic flows, according to some embodiments.

DETAILED DESCRIPTION

Figure 1:
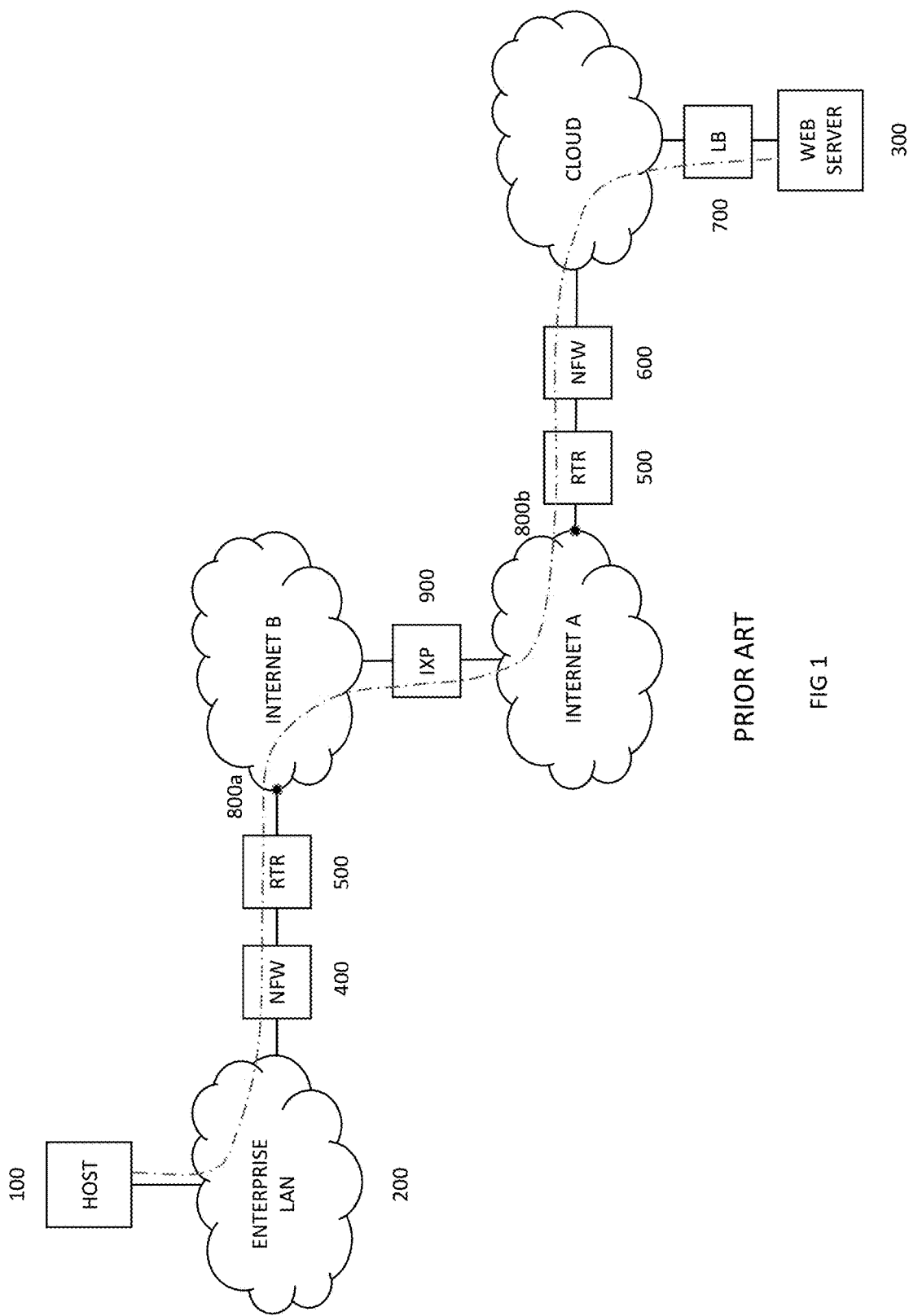
FIG. 1 is a conceptual block diagram illustrating a typical traffic flow within a network.

In computer communications, data traffic flows are identified by the tuple:

<SA, SP, DA, DP>where:
SA=Source IP address;
SP=Source IP port;
DA=Destination IP address;
DP=Destination IP port.

This tuple is referred to as a Flow ID (FID). Traffic flows are typically bidirectional and in some cases, one can expect to see mirror image (i.e. reverse path) flows as well:

<DA, DP, SA, SP>

Communicating parties typically exchange several traffic flows in a single session (e.g., an Internet browsing session, or multiple exchanges of data related to a single transaction). By gathering the metadata of traffic flows in one or more sessions, adversaries can infer that a relationship exists between communicating parties by their endpoints' source and destination addresses; what applications are being used by matching destination ports against well-known port numbers and even the physical location of the parties by mapping their endpoints' IP addresses to GPS coordinates.

A typical traffic flow is illustrated in FIG. I. Here the user of Host (100), residing on an enterprise LAN (200), wants to access information on a remote Web Server (300). The user opens his web browser, enters the URL of the web page of interest and one or more TCP connections are then made between the two network endpoints. Once the connections are made, information is exchanged between the endpoints via several traffic flows during the communications session.

The TCP connections traverse several network elements between the host (100) and the Web Server (300). These elements can include the enterprise's NAT/firewall gateway (400), intermediate IP routers (500), the Web hosting company's NAT/firewall (600), a load balancer (700) and finally the Web Server itself (300).

There are several points in the flow's path that an adversary can tap to gather metadata about the flow. The most prominent tap points are the host's or Web server's Internet Point of Presence (POP) (800a and 800b, respectively) or an intermediate Internet Exchange Point (IXP) (900) through which the traffic flows pass.

As traffic flows traverse Firewall/NAT gateways (400 and/or 600) their source and destination IP addresses typically get remapped. Flows exiting an enterprise network usually have their source addresses changed to reflect the enterprise's public (i.e. outside) IP address, e.g., an address associated with Point of Presence (POP) (800). Conversely, traffic flows entering an enterprise have their destination addresses changed to the private (i.e. internal) IP address of the corresponding endpoint host (100). More often than not, external IP flow information is collected and exploited in TFA.

Public IP addresses, and the domain names they are bound to, often uniquely identify parties on the Internet. Furthermore, these addresses can be mapped to geographic locations using open source databases. Finally, the destination ports of the traffic flows typically map to well-known applications and services.

With this information in-hand, adversaries can ascertain the identities of communicating parties; how often and how much they communicate with each other; the applications they use and their physical locations. And, if the parties are foolish enough not to use strong encryption, adversaries can also retrieve the content of the communications as well.

Prior attempts to solve this problem include the use of Virtual Private Networks (VPNs) and overlay networks such as The Onion Router (TOR). In general, prior known systems attempt to obfuscate communication sessions in their entirety by bundling and exchanging traffic flows over encrypted tunnels.

These prior known systems usually require the installation, configuration, use and management of complex, processing-intensive software clients and gateways. Because of this, they tend to be difficult to deploy and manage, are highly intrusive and are burdened with high life cycle costs.

FIG. 2A is a conceptual block diagram illustrating a prior known system that uses a Virtual Private Network (VPN) to protect data traffic flows. VPNs use clients (1000) on hosts (100) to create an encrypted tunnel (1100) over which all host traffic flows. The tunnel is terminated by a VPN server (1200) which delivers the traffic to the target network and/or web server (300), The VPN makes it difficult for adversaries to learn the content of the traffic and the applications in use, but does not completely hide the identities of the parties.

FIG. 2B is a conceptual block diagram illustrating a prior known system that uses The Onion Router (TOR). TOR adds a greater level of privacy than VPNs by setting up a random sequence of encrypted tunnels over which the session traffic between the host (300) and target network/web server (300) flows. TOR requires the use of client software (1300) on the host to originate the tunnel and one or more tunnel routers (1400a and 1400b) to switch the tunnel through. In other words, TOR sets up a first tunnel between TC 1300 and TR 1400a, and a second tunnel from TR 1400a to TR 1400b. The last tunnel router (TR 1400b) delivers the traffic in the clear to its designated networks or web server (300). Notably, once this sequence of tunnels has been set up, all data flows associated with a single session (e.g., a web browsing session, or a series of exchanges associated with a single transaction) are passed through the same sequence of encrypted tunnels. This is so even if the data flows are associated with different destination ports, destination addresses and/or source ports. Only after the session or transaction is complete will TOR tear down the sequence of tunnels that it had previously set up. TOR has been effective at obfuscating the identities of the parties and the applications they use. However, it was recently reported that a team of computer scientists, under the sponsorship of a GSO, cracked TOR's obfuscation scheme. See, e.g., Michael Mimoso, "Judge Confirms DoD) Funded Research to Decloak TOR Users," threadpost, Feb. 25, 2016, available at https://threatpost.com/judge-confirms-dod-funded-research-to-decloak-tor-users/116464/. The efficacy of the prior art, i.e. VPNs and TOR, is further hampered by its inherent lack of scalability, especially as enterprise bandwidth climbs well into the Gbps.

The presently disclosed privacy enhancing network (PEN) mitigates threats posed by TFA by taking a novel approach to obfuscating the identities of communicating parties and the traffic flows exchanged between them. And it does so in such a way that is totally transparent to the parties; requires little or no change to their IT infrastructures, has minimal impact on traffic throughput and latency, scales to meet their evolving needs, is very easy to deploy and manage and, as a result, has relatively low life cycle costs.

FIG. 2C is a conceptual block diagram of an exemplary privacy enhancing network, according to some embodiments, and how it provides per-flow traffic obfuscation as compared to the per-session obfuscation afforded by the prior art. Here, host 100 need not be provided with any special client software, but can interface directly with a series of gateways GW 1500 disposed throughout the Internet. Different data flows can be passed from the host 100 to the web server 300 via diferent flow paths 1100. Privacy enhancing networks can also comprise other components, such as one or more controllers, described in further detail below.

Figure 3:
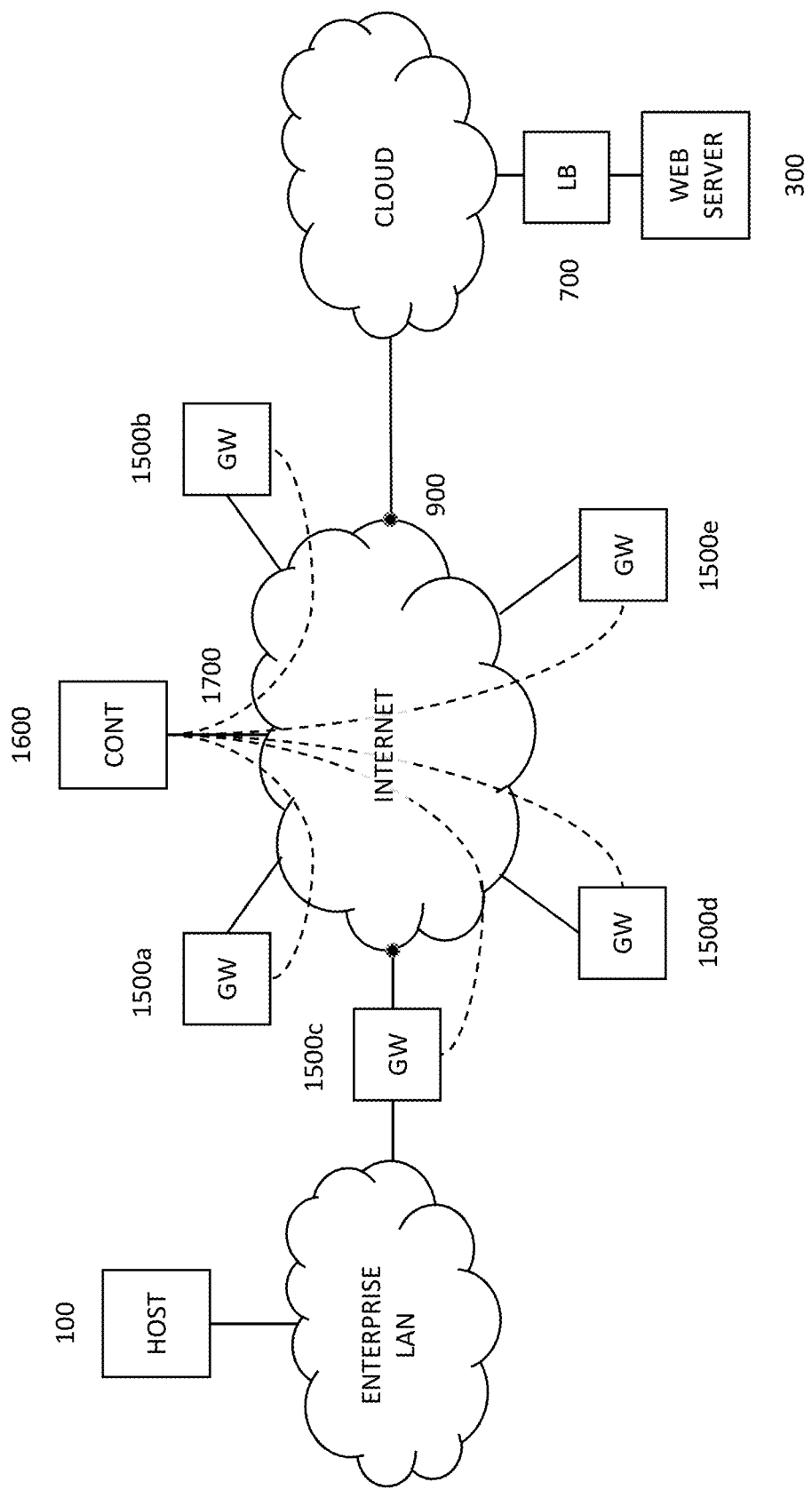
FIG. 3 is a conceptual block diagram that illustrates the components of an exemplary privacy enhancing network, according to some embodiments.

FIG. 3 is a conceptual block diagram that illustrates the components of an exemplary privacy enhancing network, according to some embodiments. The privacy enhancing network consists of two types of network nodes: controllers (1600) and gateways (1500*a-e*). Although some embodiments of the privacy enhancing network may use two or more controllers, only one controller 1600 is illustrated in FIG. 3 for ease of explication. Controller 1600 manages gateways 1500*a-e* over a dedicated., secure control plane network (1700), illustrated using dotted lines. Gateways 1500*a-e* controller 1600 can be configured to authenticate each other, and to perform the data plane processing and statistics gathering needed to obfuscate traffic flows. These elements can run on embedded hardware, dedicated computers/servers, virtual machines and software containers.

Some embodiments of the privacy enhancing network accomplish traffic flow obfuscation by forwarding each and every flow through its own random sequence of gateways sitting between a flow's source and its destination. This directly contrasts with the flow bundling approach used by prior known systems. And, unlike prior known systems, some embodiments of the privacy enhancing network do not require the installation, configuration, use and/or management of complex software clients or agents on the network endpoints (hosts, servers)

As discussed above, TOR sets up a sequence of encrypted tunnels for all data flows associated with a single session. Once set up, all data flows traverse the same path between the communicating parties, e.g., between a host and a web server. In contrast, the presently disclosed privacy enhancing network can pass each data flow of a plurality of data flows through its own unique path through a network of gateways, even if the plurality of data flows are all associated with a single session. Creating unique data flow paths for individual flows rather than sessions can increase the privacy enhancing network's degree of obfuscation more than 10-fold over prior known systems such as TOR.

Figure 4:
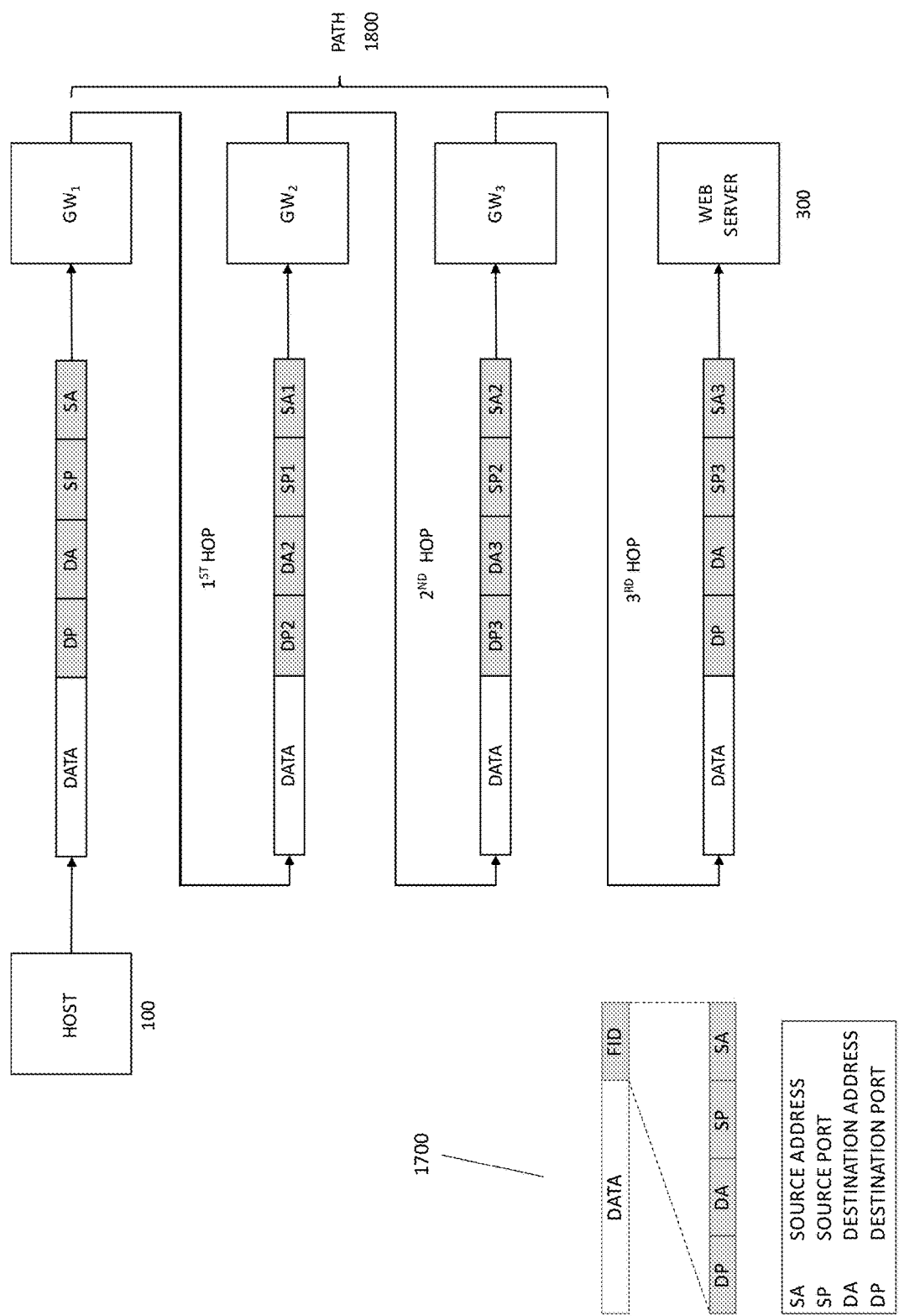
FIG. 4 is a conceptual block diagram illustrating how an exemplary data flow can be passed between multiple gateways along a path, according to some embodiments.

FIG. 4 is a conceptual block diagram illustrating how an exemplary data flow can be passed between multiple gateways, according to some embodiments. In the example depicted in FIG. 4, host 100 is attempting to pass data to web server 300. Data can be passed between network nodes, such as host 100, gateways (GW1, GW2, and GW3), and web server 300, using data flows. Diagram 1700 is a conceptual model of a flow, and illustrates that each flow consists of a data portion the payload of data being transmitted from host 100 to web server 300) and a Flow ID or FID portion. The FID portion (shaded in gray) consists of at least four sub-fields: a destination port (DP), a destination address (DA), a source port (SP), and a source address (SA).

In the example depicted in FIG. 4, host 100 first sends a first flow to gateway GW1. Gateway GW1 then modifies the HD portion of the received data flow so that, at a minimum, its source and destination addresses are changed to the current gateway's and the "next hop"gateway's IP addresses. This can be represented as a flow ID transformation (FIT):

<SA, SP, DA, DP>→<SA2, SP, DA2, DP>

A greater level of obfuscation can be achieved by modifying the flow's source and destination ports as well:

<SA, SP, DA, DP>→<SA2, SP2, DA2, DP2>

Gateway GW1 then sends the modified flow to the gateway indicated by the new destination address and/or destination port (DA2 and/or DP2). In the example depicted in FIG. 4, this new gateway is GW2. GW2 then modifies the data flow it received in a manner similar to that done by GW1, and sends the data flow to the next gateway, GW3. Gateway GW3 then modifies the data flow in a manner similar to that done by GW1 and GW2, and sends the data flow to web server 300.

The random sequence of hops a flow takes between gateways, such as GW1, GW2, and GW3, from its original source to its ultimate destination, is referred to as a path (1800). Although FIG. 4 only depicts three gateways, embodiments of the privacy enhancing network can use more or less gateways. A path can be viewed as a concatenation of flow ID transformations (FITS) performed by gateways, where each gateway modifies the flow ID portion of a received data flow, and sends the data flow to the next gateway in the path. Paths can bi-directional where the forward and reverse paths are mirror images of each other. They also can be unidirectional where the traffic sent by the source and destination travels along its own independently selected path.

The sequence of hops in a given path is computed upon request by the controller (1600). The controller (1600) can be implemented on any physical or virtual device in communication with each of the gateways 1500*a-e*. When the controller has computed a given path (e.g., path 1800), the controller stores the path in a list of active paths and also sends flow ID transformations (FITs) to each gateway in the path. Flow ID transformations (FITs) can be information that enables each gateway to identify whether received data traffic corresponds to a particular flow, and to forward traffic corresponding to a particular flow to the next gateway in the path. When each gateway receives the FITs, the gateway canbeconfigured to forward traffic associated with a particular flow to the next gateway in the path (1800) computed by the controller (1600). The gateway can identify whether received traffic corresponds to a particular flow by examining a Flow ID in the received traffic, which can comprise the tuple <DA, DP, SA, SP>, or a unique number or alphanumeric string that identifies the flow. In this way. controller (1600) can dynamically create, upon request, unique paths for data flows through a network of gateways. In some embodiments, the complete data flow path computed by the controller is not shared with any gateway instead, each gateway only receives the information it needs to forward data related to a particular data flow to the next gateway in the path. Therefore, no network node or element other than the controller can reconstruct the complete data flow path.

Once a data flow has ended, a gateway can also send a "delete" request to the controller (1600), which causes the controller to delete the path from its list of active paths. This can also cause the controller (1600) to send to each gateway an instruction to delete the FITs associated with the deleted path. In this way, controller (1600) can also dynamically tear down previously created paths.

By dynamically creating and tearing down unique data flow paths through a network of gateways for each individual data flow, the privacy enhancing network makes it more difficult for an adversary to glean information about communicating parties. Since each flow in a single data session may be routed through a different path, adversaries may find it more difficult to determine which data flows are associated with each data session. This in turn, makes it more difficult for adversaries to gather enough data traffic to break any encryption applied to the data flows. Indeed, since each flow in a single data session may be directed along a different path, a privacy enhancing network may make it difficult for adversaries to even determine that the communicating parties are communicating at all.

Figure 5:
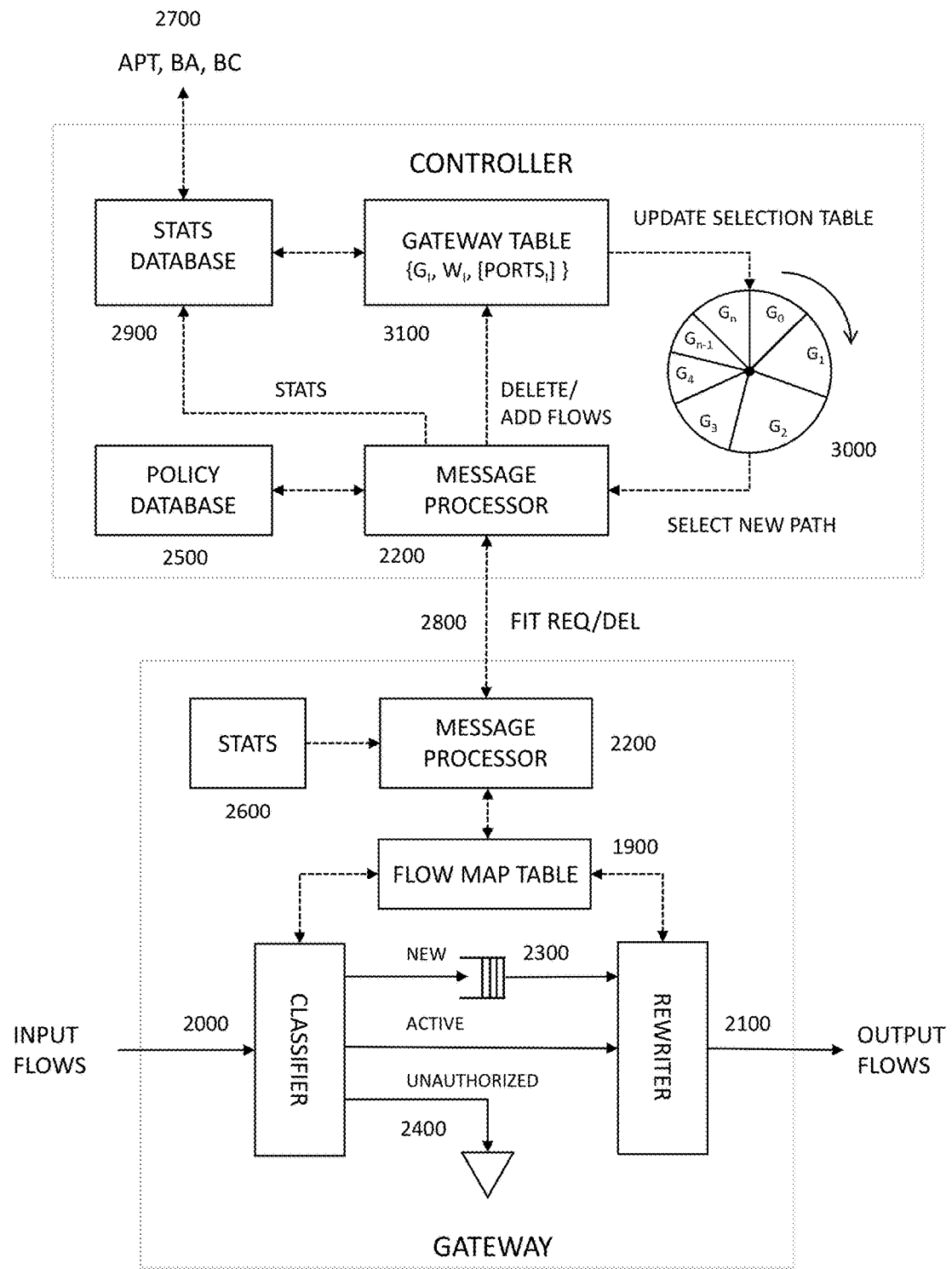
FIG. 5 is a conceptual block diagram that shows the components of an exemplary controller and an exemplary gateway, according to some embodiments.

FIG. 5 is a conceptual block diagram that shows the components of an exemplary gateway and an exemplary controller, according to some embodiments. Each Gateway maintains its own table of local FITs which is referred to as flow map table (1900). As a flow enters the gateway, a packet classifier (2000) looks in the flow map table for a matching FIT. This matching can be done by matching a Flow ID embedded in the flow with Flow IDs in the flow map table. As discussed above, a Flow ID can take the form of a tuple, i.e., <SA, SP, DA, DP>. Alternatively, the Flow ID can take the form of a unique number or alphanumeric string associated with a particular flow. If a match is found the flow is considered active, its FID is modified by a packet rewriter (2100) and the flow is then forwarded to its next hop. This corresponds to the "ACTIVE" mapping path between the classifier 2000 and rewriter 2100 illustrated in FIG. 5. If no match is found, and the gateway is configured as an origin gateway, the gateway requests a new FIT for the new flow from the controller via its message processor (2200) and buffers the flow in buffer 2300 until the requested FIT is assigned. This corresponds to the "NEW" mapping path between the classifier 2000 and rewriter 2100 illustrated in FIG. 5.

The controller can comprise a message processor 2200, a policy database 2500, a stats database 2900, a gateway table 3100, and a path selection module 3000. Each of these components may be implemented as dedicated hardware components, or software instructions stored in memory and executed by a processing device, such as a processor or a microprocessor. The controller receives requests for new FITs via its message processor 2200.

The PEN's architecture makes it ideally suited for managing both intra-enterprise and inter-enterprise communications sessions. With the appropriate policies defined in the policy database (2500), the controller can make decisions whether to grant or deny communications between parties based on the respective policies assigned to them. These policies can be contextual (time, place, endpoints used, etc.) and of various levels of granularity (network, endpoints, applications/services, URIs/URLs).

When a request for a new FIT is received, the controller will assign a FIT to the flow if there is a rule in its policy database (2500) that permits it to do so. For example, the policy database 2500 may have a rule that states that a computer at a given source address is permitted to communicate with a server at a given destination address. As another example, the policy database 2500 may have a rule that states that such communications are only allowed during business hours at the enterprise's geographic location. The enterprise's Chief Information Security Office (CISO) is typically responsible for establishing the policies and the associated set of rules in the policy database 2500. If there is no such policy permitting the communication, the flow can be considered as an unauthorized flow and is dropped. This corresponds to the "UNAUTHORIZED" mapping path in the gateway illustrated in FIG. 5.

The gateway maintains statistics for each flow that enters and exits it in a statistics table (2600). These statistics are collected, stored and forwarded to the controller for use in its path selection algorithm, as well as to other third-party analytic tools and services such as Advanced Persistent Threat Detection (APT), Behavior Analytics (BA) and Billing/Charging, (B/C) to name a few (2700).

The controller is responsible for creating random paths for all new flows entering the privacy enhanced network through origin gateways and deleting paths when flows terminate or time out. Paths are created every time the controller's message processor (2200) receives a FIT request from an origin gateway d there is rule in its policy database (2500) permitting it to do so. FIT requests are made over a secure control channel between origin gateways and the controller (2800).

The goal of the controller is to select paths that make it practically impossible for adversaries to discern information regarding the communicating parties, such as the parties' source and destination addresses and/or ports, the applications they are using, and even the fact that the parties are communicating at all. And the controller attempts to do so in a way that maximizes the utility of available resources. These resources can include computing cycles, memory, network bandwidth, latency and a host of others. Statistics regarding these resources and collected from each gateway and stored in the controller's statistics database (2900).

The controller uses these statistics in its path selection module (3000), which implements a path selection algorithm (PSA). In making path selections, the PSA balances available resources against its goal of maximizing the average entropy (i.e. randomness) of the paths. The PSA can take into account different configurable parameters/criteria to accommodate different users' needs and goals when making path selections. Such parameters/criteria can be embedded directly in the PSA or in the controller's policy database (2900). This information can also be reflected in the gateway table (3100) used by the PSA. In addition to specifying how to setup paths based on available resources, the policy database 2500 can also be used to set permissions regarding how, when, where and which parties and their corresponding endpoints are permitted to communicate.

When the controller receives a FIT request from a gateway, and assuming the stored policy rules in policy database 2500 permit the FIT to be assigned, the controller creates a path by selecting K gateways at random, from the set of available gateways $\{G_N\}$, where K<=N. The probability of selecting a given gateway ($G_i$) is proportional to its weight ($W_i$). A weight reflects the overall desirability of selecting a given gateway and can be based on the available resources at the gateway, the resources available at other gateways, and the relative importance of these resources.

There are a variety of algorithms that can be used to implement the random gateway selection process. Given the real-time nature of a PEN, preference is given to algorithms that are fast, efficient and scale well.

Figure 6:
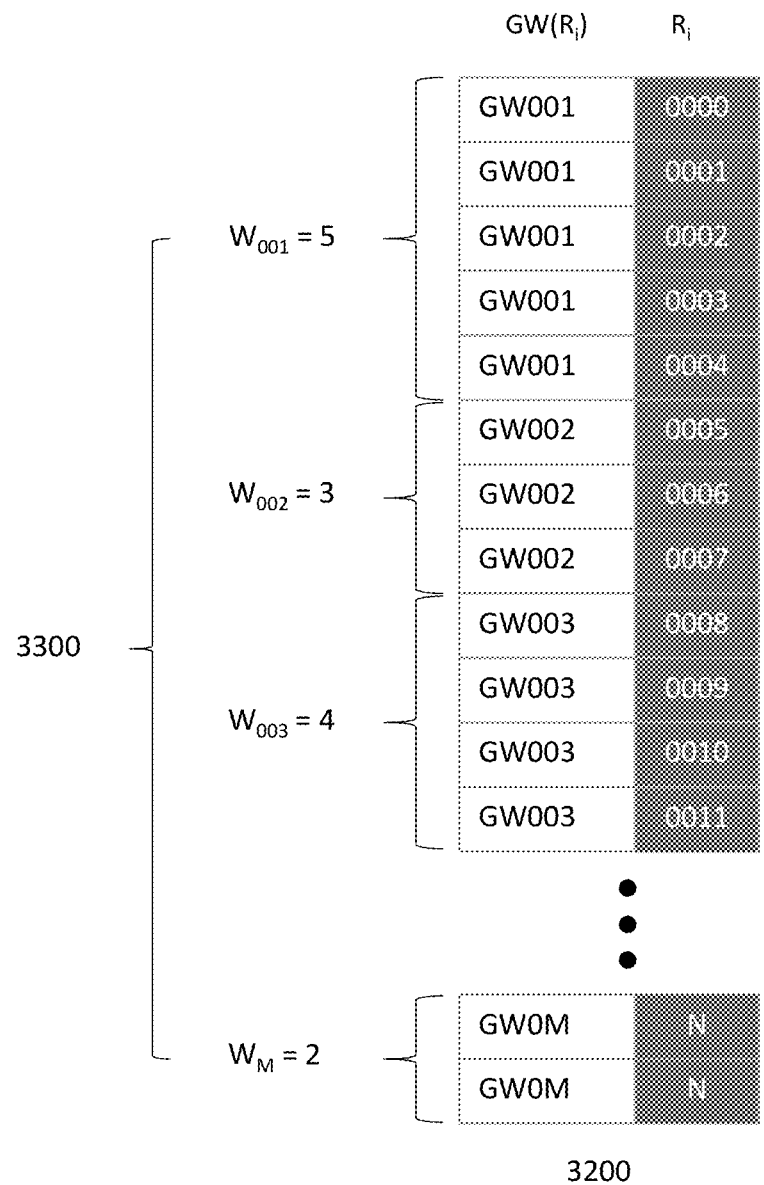
FIG. 6 depicts an exemplary data table used in a "roulette wheel" algorithm for selecting gateways for a path, according to some embodiments.

One such algorithm is the "roulette wheel" algorithm, an exemplary embodiment of which is illustrated in FIG. 6. A roulette wheel is simulated as a table (3200) containing $W_i$-entries for each gateway, where $W_i$ is the gateway's weight as stored in gateway table (3300). So for instance, since gateway GW001 has a weight $W_{001}$ of 5, table 3200 would contain 5 entries corresponding to gateway GW001. Similarly, since gateway GW002 has a weight $W_{002}$ of 3, table 3200 would contain 3 entries corresponding to gateway GW002. Assuming that there are M gateways in the privacy enhancing network, the table (3200) therefore contains N entries, where $N=\Sigma_{i=1}^{M} W_i$. In some embodiments, instead of containing $W_i$ entries for each gateway 1 . . . M, the table may contain $L_i$ entries for each gateway 1 . . . M, where $L_i$ is proportional to $W_i$.

For each path (3400), K gateways are selected without replacement by generating a random index (e.g., using a pseudo-random number generator), uniformly distributed over the total number of available entries, for each gateway in the path. That is, for each gateway slot $GW_i$ between $GW_1 \ldots GW_k$, the controller fills the slot by generating a random index $R_j$, where $R_j$ is uniformly distributed between $1 \ldots N$. The randomly generated index $R_j$ is used to identify a particular entry in table (3200), and the gateway corresponding to the identified entry is selected to fill the gateway slot $GW_j$. This algorithm can be extremely fast and efficient for relatively large numbers of Gateways (e.g., 10 million or more). For even larger numbers well-known algorithms such as Reservoir Random Selection may be used.

For the purpose of illustration, a good estimate of the average entropy (E) of K-hop paths in a PEN with N Gateways is given by:

$$E = \log((N-K)!/N!), K <= N$$

It can be seen that for even a modest sized PEN, employing 4-hop paths selected from a set of 250 gateways, there are 3.813 billion unique possible paths. Using this equation yields an entropy of 22.

Hence, to analyze just one flow, an adversary would have to sift through nearly 4 billion possible combinations. Given that there may be millions of flows traversing a PEN at any given time, sifting through these combinations can be an extremely expensive, time consuming problem to solve.

As computing power increases, one can easily increase the entropy of the PEN by adding more Gateways, increasing the path length or by doing both. Arid, if that's not enough, simulated traffic can be injected into the PEN as well, as described in further detail below.

When a gateway first comes up it attempts to authenticate itself to the controller it is assigned to. This can be done in a number of ways. One such way is using authentication tokens which are presented to the controller when gateways make new connections to the controller.

Figure 7:
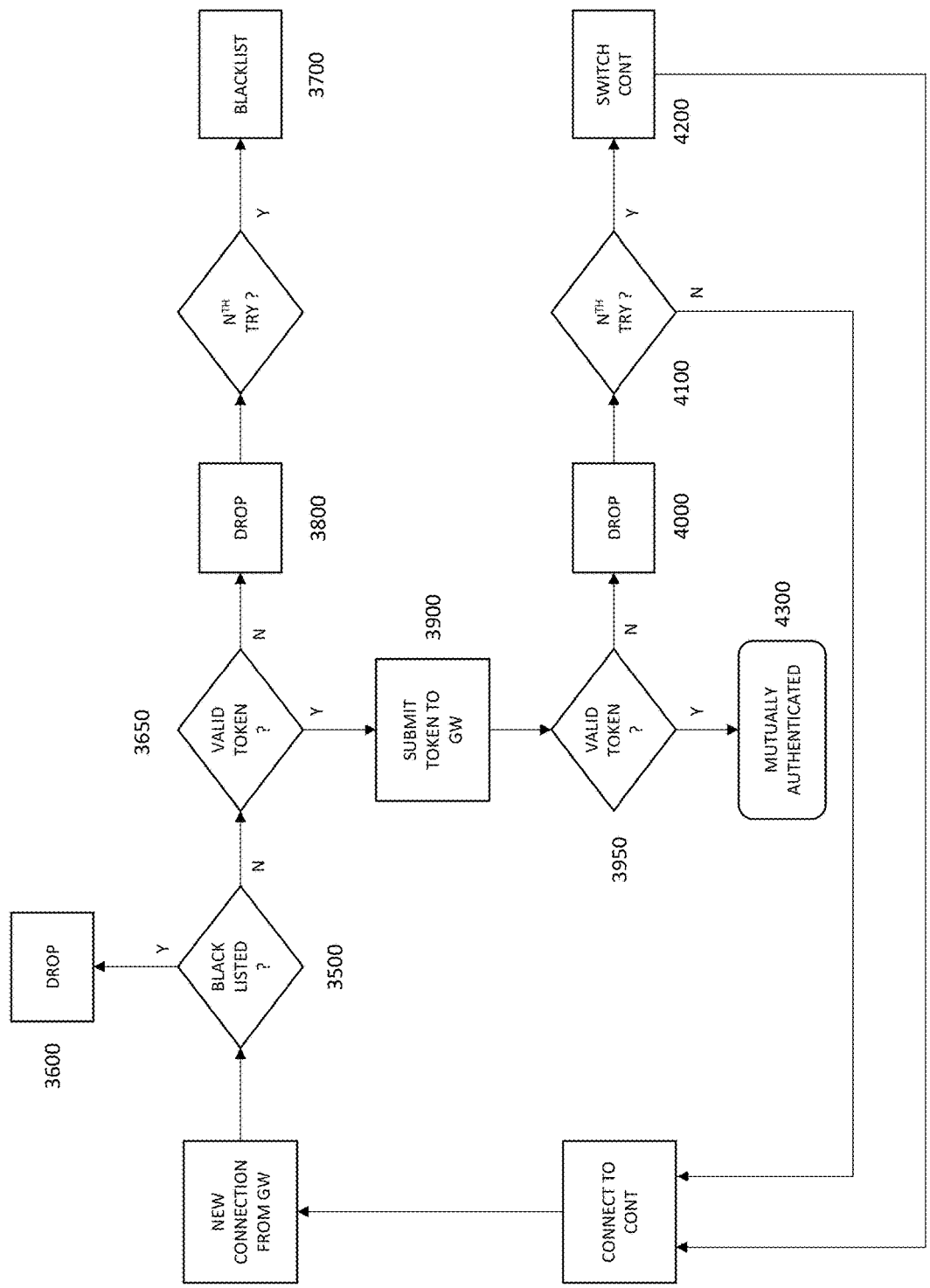
FIG. 7 is a flow-chart illustrating an exemplary process for authenticating a gateway and a controller to each other, according to sonic embodiments.

FIG. 7 is a flow-chart illustrating an exemplary process for authenticating a gateway and a controller to each other, according to some embodiments. When a gateway makes a new connection attempt to its controller the first thing the controller does is to check whether that gateway has been blacklisted (3500). The connection is refused and dropped immediately if it is from a blacklisted gateway (3600). If a gateway makes too many unsuccessful authentication attempts (e.g., more than N times), the gateway is assumed to be an imposter and is blacklisted (3700). In addition, in some embodiments, if a gateway makes no authentication attempts at all within a predetermined period of time, the controller can also assume that the gateway is an imposter and blacklist the gateway. Assuming the gateway is not blacklisted, the controller examines a token presented by the gateway (3650). This token is cryptographically secure and only valid for the given connection request. If the controller determines that the token is invalid it closes the connection to the gateway (3800). The gateway is given a fixed number of attempts to authenticate. If all attempts fail, the controller blacklists the gateway and all further connection attempts are refused (3700).

If the controller deems the token valid, the controller generates its own token and sends it to the gateway for validation (3900). The gateway then examines the controller's token (3950). If the gateway determines the controller's token to be invalid it closes the connection (4000). Depending on its configuration, the gateway may attempt to connect to the same controller a fixed number of tunes (4100). If all mutual authentication attempts fail, the gateway will move on to the next controller it is assigned to (4200).

Once a Gateway and its Controller are mutually authenticated (4300), they begin exchanging secure messages with one another. These messages are used to create and manage Paths in the PEN. Some messages include:

"START": a message sent from a controller to instruct a gateway to start processing flows;

"STOP": a message sent from a controller to a gateway to instruct a gateway to stop processing flows;

"AUTH": a request from a gateway to a controller, or from a controller to a gateway, to start an authentication process;

"REQUEST_RULE": a request from a gateway to a controller for one or more new FIT rules:

"ADD_RULE": a message sent from a controller to instruct a gateway to add one or more new FIT rules;

"DEL_RULE": a message sent from a gateway that causes a controller to delete an active path from a list of active paths, or a message sent from a controller to instruct a gateway to delete a FIT rule in its flow map table;

"LOAD_CONFIG": a message from a controller to instruct a gateway to load a specific configuration;

"REVERT_CONFIG": a message from a controller o instruct a gateway to load a previous configuration;

"SEND_STATS": a message from a controller to instruct a gateway to send traffic flow and resource statistics to the controller.

As in many communications networks, the controller is a critical component and needs to be highly scalable, available and robust. In some embodiments, a PEN can employ two or more Controllers. These Controllers can run in a load sharing mode and may deployed in geographically diverse locations.

Figure 8:
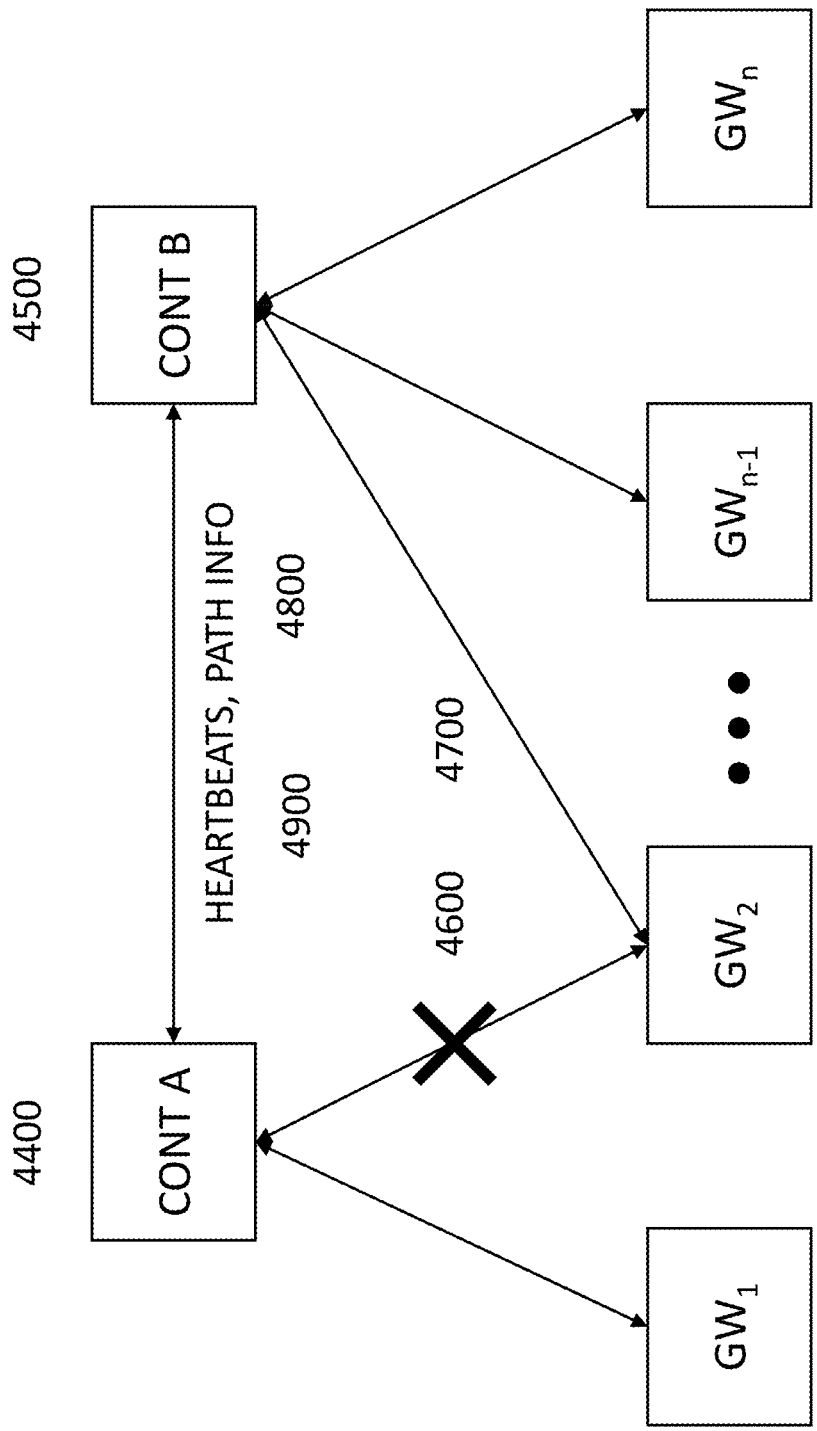
FIG. 8 illustrates an exemplary PEN including two controllers, according to some embodiments.

FIG. 8 illustrates an exemplary PEN including two controllers, according to some embodiments. In the exemplary PEN illustrated in FIG. 8, each gateway is assigned to a primary (4400) and secondary controller (4500). All control messages are directed to and received from the primary controller. If a gateway loses its connection to its primary controller (as illustrated by the crossed out datalink 4600 between primary controller 4400 and $GW_2$), i.e. it is no longer receiving messages from it, the gateway will automatically switch to its secondary controller (as illustrated by data link 4700).

Primary and secondary controllers also communicate securely with one another. Controllers periodically exchange data regarding the paths they are managing with their companion controller (4800). This enables each controller to mirror its partner and to be prepared to assume control if its partner fails or is otherwise unreachable by its gateways.

Primary and secondary controllers also exchange periodic heartbeat messages (4900). If, after a prescribed period of time, a controller does not receive a heartbeat message from its partner, the controller assumes its partner is down and will start accepting connection requests from its partner's gateways (4700).

No direct intervention is needed from the controller for gateways to switch from their primary to their secondary controllers. Gateways make local decisions regarding the status of their controllers and will switch them as needed (4700).

Controllers are sized to the PENs they manage. The two most critical factors affecting the required size of a controller are control plane bandwidth and the average flows-per-second (FPS) load. Control plane messages can be fairly short (<100 bytes) and a 1 Gbps control plane can, in some cases, handle about 1 million FPS.

At present, a single 3Ghz, 64-bit CPU core can process about 125K FPS. Assuming the typical user generates an average of 5 FPS, then a single-core Controller can easily support 25K users. This number is well within the bounds of the typical large enterprise.

Figure 9:
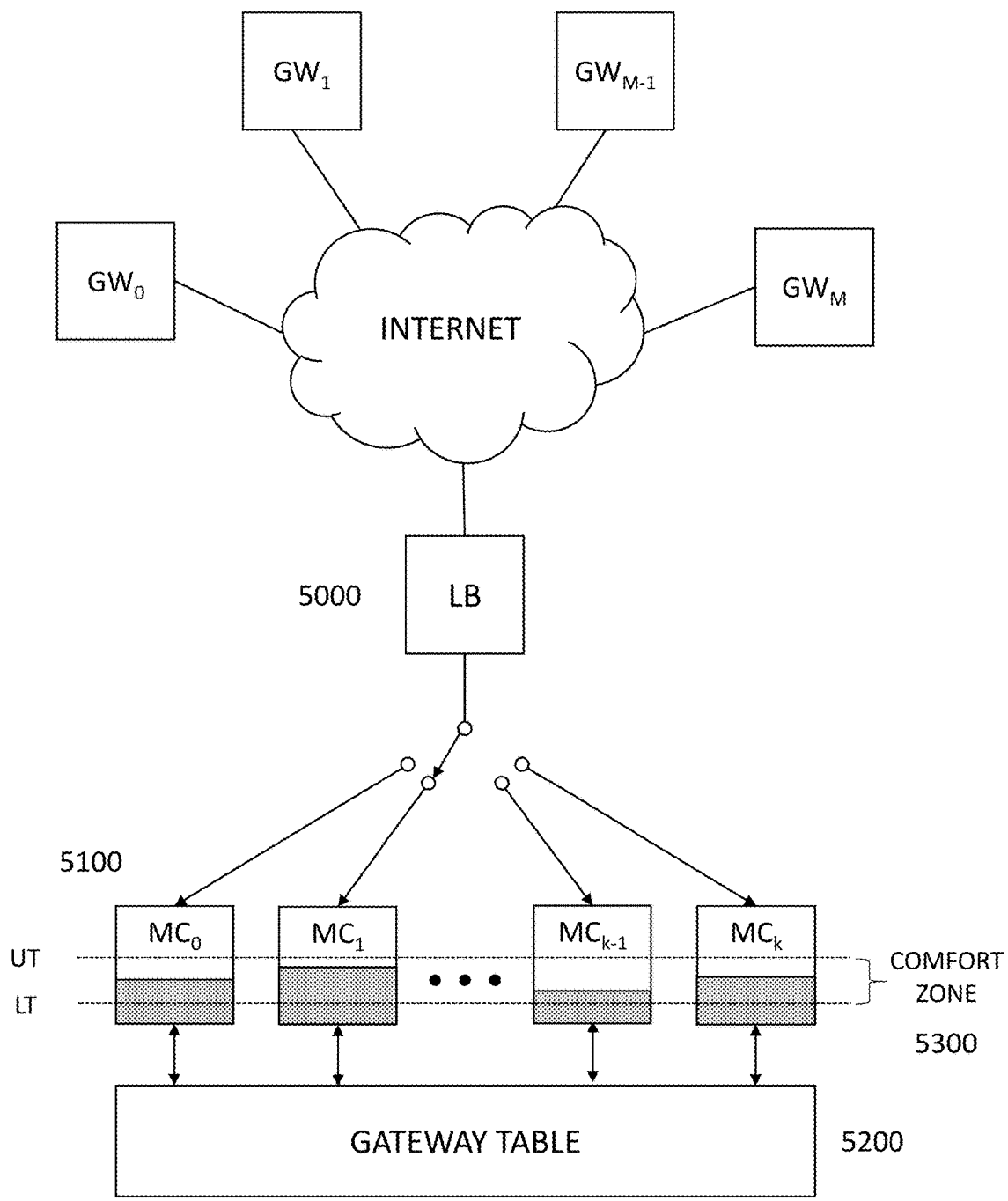
FIG. 9 illustrates an exemplary privacy enhancing network that utilizes load balancing, according to some embodiments.

FPS scaling beyond this level can be achieved using well known techniques such as load balancing. FIG. 9 illustrates an exemplary privacy enhancing network that utilizes load balancing, according to some embodiments. Control plane messages can be evenly distributed by a load balancer (LB) (5000) across a set of mini-controllers (MCs 1 ... k) (5100) which share a common gateway resource table (5200). In some embodiments, this common gateway resource table (5200) can perform the same functions described as being performed by gateway table (3100) in FIG. 5, except that it is shared by the set of Mini-Controllers. Each MC processes and responds to its assigned messages in kind. From a gateway's perspective this appears as a single, coherent, high performance Controller.

The LB (5000) monitors the state of each MC in real-time, including the "load" being borne by each MC. The "load" being borne by each MC can be measured in a variety of ways, including the number of messages it is processing, the amount of memory it is consuming, current CPU utilization, its latency, or the size of a buffer queue. If the average load of the set of active MCs hits a predetermined upper threshold (UT) the LB will "spin-up" (add) additional MCs. Conversely, if the average load dips below a predetermined lower threshold (LT) the LB will "spin-down" (delete) MCs. Much like a thermostat the LB tries to maintain the average FPS load across active MCs in a well-defined band/comfort zone (5300). The LB 5000 will also try to allocate messages to controllers (e.g., requests for new FITs) to controllers with relatively low load.

According to some embodiments, the presently disclosed privacy enhancing network can support three modes of operation. Each has advantages and disadvantages.

The first mode is Flow Slinging Mode (FSM). In this mode, gateways take incoming flows, modify them in accordance with their local FIT tables and then forward the flows to their next hops. In this mode, gateways do a bare minimum of buffering and do not perform any Layer 3-4 processing beyond packer header and counter modifications. FSM offers the highest performance for a given platform as it doesn't apply the full Layer 2-4 stack (i.e. TCP/TLS) to the flows. It simply modifies and forwards packets. This works well in networks with low latency and packet loss rates.

For networks that do not have low latency and packet loss rates, the Flow Concatenation Mode (FCM) can be used. When traversing networks with high latency or packet loss, FCM can provide greater end-to-end performance. Radio networks (LTE, MESH, Satellite, etc.) typically fall into this category.

In FCM, gateways terminate in-bound flows, re-originate outbound flows and bind the two together based on their local FIT tables. In a way, they act as Layer 4 proxies. This mode is processor and memory intensive since it has to implement the full Layer 2-4 protocol stack. As such it doesn't scale as well as FSM. However, it does offer greater performance in high latency/packet loss environments.

There maybeuse cases where hops in a given path traverse both high and low quality networks. This can occur when traffic flows traverse both wireless and fixed-line e, fiber) networks. In such cases the PEN may run in multi-mode (MM) where high-quality hops employ FSM, and low-quality hops use FCM.

Figure 10:
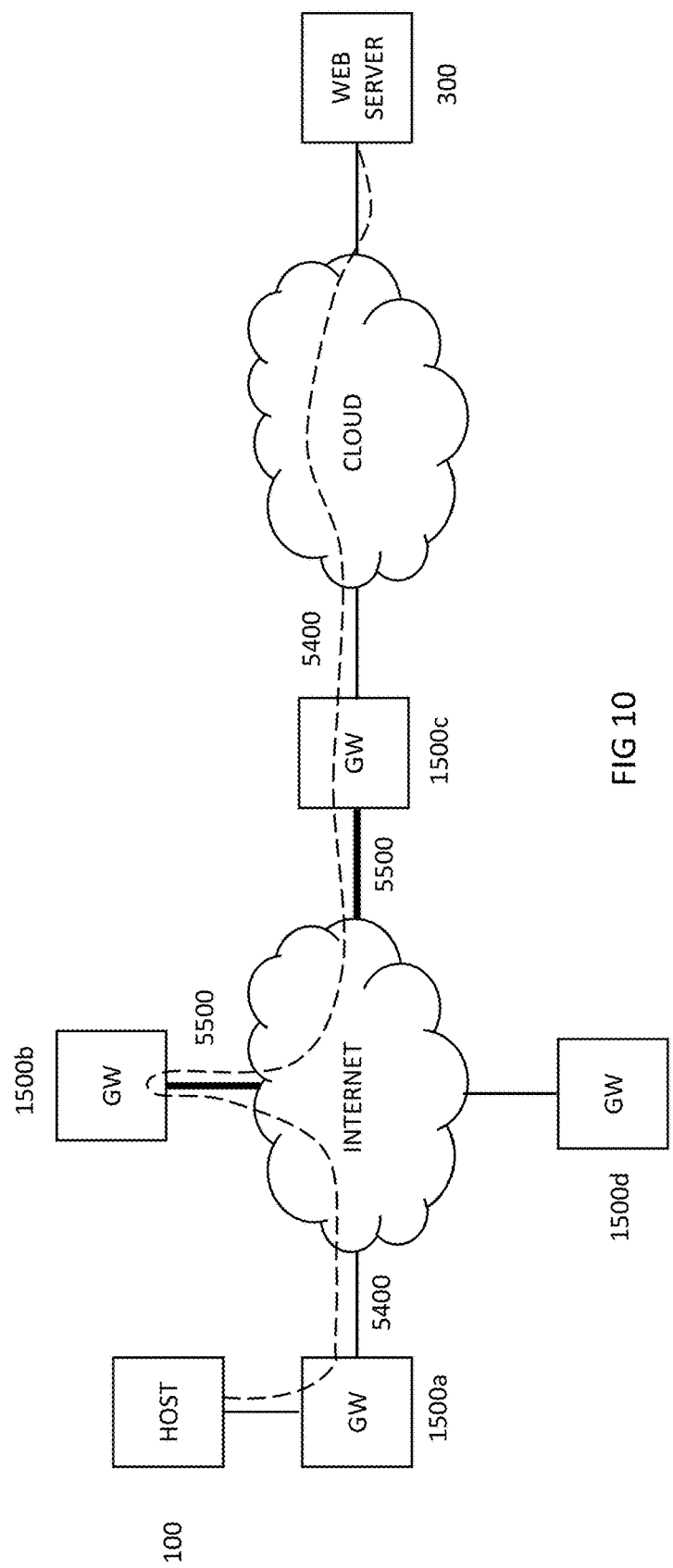
FIG. 10 illustrates an exemplary PEN operating in multimode, according to some embodiments.

FIG. 10 illustrates an exemplary PEN operating in multi-mode, according to some embodiments. Similar to FIGS. 2 and 3, FIG. 10 includes a host (100) attempting to communicate with web server (300). Also similar to FIG. 3, FIG. 10 includes a plurality of gateways, 1500a, h, c, and d. In the example depicted in FIG. 10, the privacy enhancing network is routing traffic according to the following path: host (100) to GW (1500a), to GW 1500b), to GW (1500c), and from there to web server (300). High quality network data links exist between host (100) and GW 1500a between GW 1500a and GW 1500b, and between GW 1500c and web server 300. On the other hand, relatively low quality network data links exist between GW 1500b and GW 1500c. Therefore, the PEN operates in FSM (illustrated by 5400) between host (100) and GW 1500a, between GW 1500a and GW 1500b, and between GW 1500c and web server 300, and in FCM (illustrated by 5500) between GW 1500b and GW 1500c.

The PEN can be designed to be as transparent and seamless as possible. As such, some embodiments of the PEN make no assumptions with respect to any end-to-end encryption or QoS mechanisms employed in the underlying networks. Some embodiments of the PEN can merely take flows in apply the applicable policies and flow transformations, and transport them across their assigned path.

Figure 11:
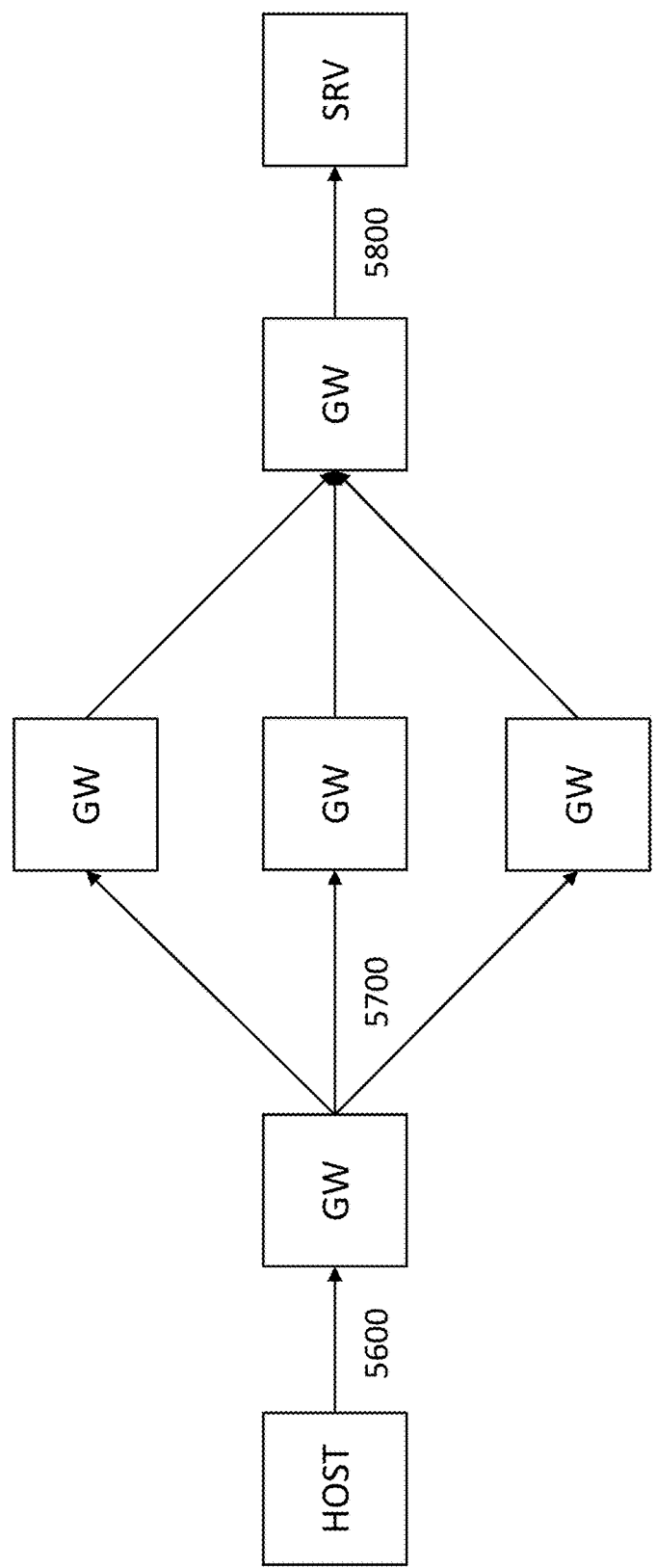
FIG. 11 depicts PEN that splits flows into multiple microflows, according to some embodiments.

FIG. 11 depicts a PEN that splits flows into multiple micro-flows, according to some embodiments. For Enterprises with greater throughput and security requirements, a given flow (5600) can be split into several micro-flows (5700) at its origin gateway, spread across multiple paths and then reassembled at their exit gateway (5800) before being delivered to their destinations. A flow (5600) can be split into multiple micro-flows (5700) in different ways. For example, individual packets within flow (5600) may be categorized into different micro-flows (5700) and routed to the destination gateway via separate paths computed by the controller. Alternatively, each packet in flow (5600) may be split into different multiple sub-components, and each sub-component may be sorted into different micro-flows. Other ways of splitting a flow into multiple micro-flows are also possible.

Figure 12:
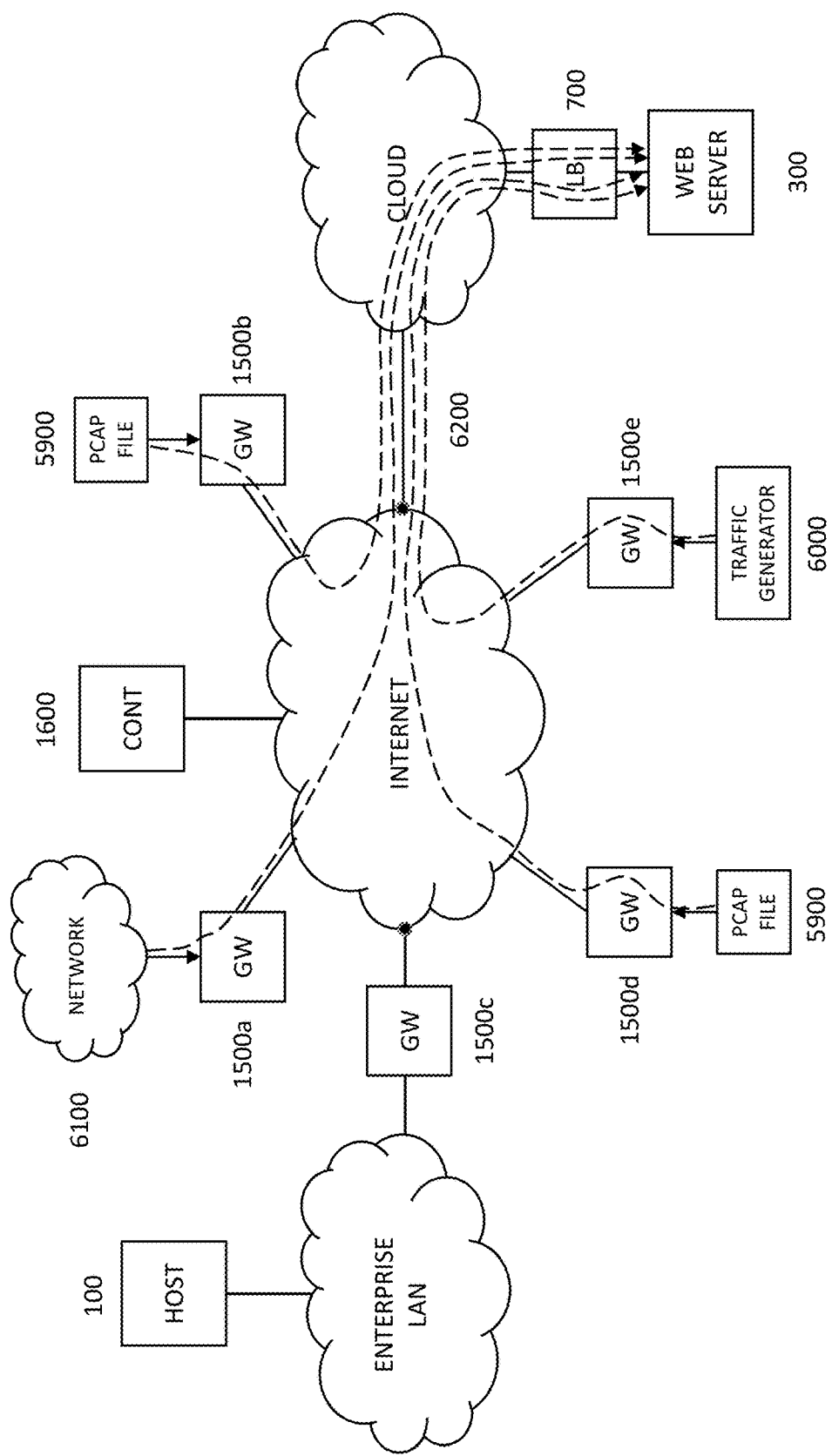
FIG. 12 depicts a PEN that injects simulated traffic flows into a network to increase obfuscation and stress test target network and application servers.

In some use cases it may be desirable to add an additional layer of obfuscation by injecting simulated flows into the PEN. FIG. 12 depicts a PEN that includes one or more simulated flows, according to some embodiments. These injected, simulated flows can be directed to a single network node, such as web server 300, or to multiple network nodes. Such simulated network flows can add an additional level of obfuscation for an adversary because they can make it difficult for an adversary to determine whether any given flow is a real flow or a simulated flow. Furthermore, the PEN's traffic injection capabilities can be used to test and evaluate the resiliency and load-bearing capability of various network services or applications, e.g., services or applications hosted on one or more web servers 300. The PEN can be configured to direct a prescribed level and type of traffic; for a fixed period of time; at a given network, application or service; from a prescribed number of simulated endpoints; to see at which point the network, application or service fails.

These simulated flows can be generated in at least three ways: using an on-board packet file, or PCAP file (5900), a traffic generator (6000), or using another active network, such as the Internet (6100).

An on-board packet file, or PCAP file (5900) can be a file that includes one or more simulated packets, or information that can be used to generate simulated packets. For instance, a PCAP file (5900) can comprise a text file that stores data that can be used to populate simulated packets. This PCAP file (5900) can be stored in memory located within a gateway, or in memory communicatively coupled to a gateway. In operation, a gateway (such as gateway GW 1500*b* and/or GW 1500*d*) can generate simulated packets whose payloads comprise data taken or generated from PCAP file (5900).

In some embodiments, the gateway can also populate the headers of these simulated packets with a source address, source port, destination address, or destination port. For instance, when stress testing the capabilities of a specific web server 300, gateways 1500*b* and/or 1500*d* can direct the generated simulated packets to web server 300 by filling in a destination address and destination port corresponding to web server 300. In some embodiments, gateways 1500*b* and/or 1500*d* can also fill the source address and/or source port with randomly generated source addresses/source ports. From web server 300's perspective, it would seem as if it was receiving packets from a wide variety of source addresses and source ports. In some embodiments, web server 300 would have no way of knowing that these packets are being generated and sent by gateways 1500*b* and 1500*d*.

In some embodiments, gateways can also inject packets generated by a traffic generator 6000 into the PEN. Traffic generator 6000 can be a separate device that plugs into a gateway, e.g., gateway 1500*e*, and which generates simulated packets on command. Gateway 1500*e* can then fill in or modify these simulated packets' headers with source address, source port, destination address, and destination port address, as described above for PCAP files.

In some embodiments, gateways can also generate simulated packets using packets received or copied from a network 6100, such as the Internet. A gateway that is coupled to both the PEN as well as the network 6100 (e.g., gateway 1500*a*) can generate these simulated packets. The contents of these simulated packets can be copied directly from the received/copied packets from network 6100, or can be modified versions of the received/copied packets. Gateway 1500*a* can then fill in or modify these simulated packets' headers with source address, source port, destination address, and destination port address, as described above for PCAP files.

The elements of the PEN described herein, such as gateways and controllers, may be implemented on one or more host computers or computing devices that contain volatile memory, a persistent storage device such as a hard drive, a processor, and a network interface (hosts). These hosts may be dedicated (i.e., physical), shared (i.e., virtual) and/or software containers. The programmatic processes described herein may be executed on a single host, or they may be distributed across multiple hosts. The one or more host computers may also optionally be connected to a graphical display device, such as a monitor, and input devices such as a mouse and keyboard. All references to software components in this specification are intended to also apply to software running on hardware. Likewise, objects and data structures referred to in the specification are intended to apply to data structures actually stored in memory, either volatile or non-volatile. Similarly, references to servers and gateways are intended to apply to software running on hardware such as the one or more host computers described above. The elements of the PEN described herein may also be embodied in software stored in non-transitory computer readable media that, when installed on appropriate computing hardware, enables the hardware to perform the functions of gateways and controllers, as described herein. The foregoing has outlined some of the more pertinent features of the subject matter. These features should be construed to be merely illustrative. Many other beneficial results can be attained by applying the disclosed subject matter in a different manner or by modifying the subject matter.

The invention claimed is:

1. A method for obscuring data flow paths through a network of gateways, the method comprising:
providing a controller in communication with each gateway in the network of gateways;
receiving, at the controller, a request for a flow path through the network of gateways from an originating gateway to a destination gateway;
computing, by the controller in response to the request, a unique flow path comprising a random sequence of intervening gateways between the originating gateway and the destination gateway; and
sending, from the controller to each intervening gateway in the computed flow path, flow transformation information to enable each intervening gateway to forward received data traffic to the next intervening gateway in the random sequence.

2. The method of claim 1, wherein the unique flow path is computed based on a set of weights assigned to each gateway in the network of gateways.

3. The method of claim 2, wherein the set of weights indicates the relative load being processed by each respective gateway in the network of gateways.

4. The method of claim 1, wherein the request is associated with a data flow from a single port at a single source address to a single destination port at a single destination address.

5. The method of claim 4, wherein the flow transformation information sent to a particular intervening gateway in the random sequence of intervening gateways comprises:
a flow ID associated with the data flow; and
information identifying a next intervening gateway in the random sequence.

6. The method of claim 1, further comprising authenticating, by the controller, at least some of the gateways in the network of gateways.

7. The method of claim 1, further comprising authenticating the controller by at least one gateway in the network of gateways.

8. The method of claim 1, wherein the controller only sends information pertaining to a subset of the entire random sequence of intervening gateways to any single gateway.

9. The method of claim 1, wherein the request is associated with a single data flow of a data session, and wherein the data session comprises a plurality of other data flows, the method further comprising computing, by the controller, different flow paths for each of the other data flows.

10. The method of claim 1, further comprising splitting a single, original data flow into multiple micro-flows, wherein the request is associated with a single micro-flow, and wherein the method further comprises computing, by the controller, different flow paths for each of the other micro-flows.

11. A controller for obscuring data flow paths through a network of gateways, the controller comprising:
a network interface for enabling communication with each gateway in the network of gateways;

a processor configured to:
receive, via the network interface, a request for a flow path through the network of gateways from an originating gateway to a destination gateway;
compute, in response to the request, a unique flow path comprising a random sequence of intervening gateways between the originating gateway and the destination gateway; and
send, via the network interface to each intervening gateway in the computed flow path, flow transformation information to enable each intervening gateway to forward received data traffic to the next intervening gateway in the random sequence.

12. The controller of claim 11, wherein the controller is further configured to:
store information regarding the computed flow path in a list of active paths;
receive, via the network interface, a request from a gateway of the network of gateways to delete the information; and
delete, in response to the request, the information from the list of active paths.

13. The controller of claim 11, wherein the controller is further configured to receive, via the network interface, aggregate and per-flow traffic statistics from each gateway in the network of gateways.

14. The controller of claim 13, wherein the controller is configured to compute the unique flow path based at least in part on the received aggregate and per-flow traffic statistics.

15. The controller of claim 13, wherein the controller is configured to employ a policy database, and a set of rules within the database, to decide whether a flow path should be computed.

16. A method for obscuring data flow paths through a network of gateways, the method comprising:
receiving at a first gateway data traffic associated with a flow ID;
searching a table of flow ID transformations (FITs) for a FIT that corresponds to the flow ID;
when there is a corresponding FIT, forwarding the received data traffic from the first gateway to a subsequent gateway indicated by the corresponding FIT; and
when there is no corresponding FIT:
sending, from the first gateway to a controller, a request for a flow path associated with the flow ID through the network of gateways to a destination gateway, and
receiving from the controller, at the first gateway and at each respective gateway along a random sequence of intervening gateways between the first gateway and the destination gateway, flow transformation information that enables the first gateway and each intervening gateway to forward received data traffic associated with the flow ID to the next intervening gateway in the random sequence, wherein the random sequence of intervening gateways is unique to the flow ID.

17. The method of claim 16, further comprising:
when there is no corresponding FIT:
buffering the received data traffic at the first gateway;
after receiving, from the controller, the flow transformation information at the first gateway, releasing the buffered traffic at the first gateway by sending it to the next intervening gateway in the random sequence of intervening gateways.

18. The method of claim 16, further comprising:
computing, by the controller in response to the request for the flow path from the first gateway, a flow path comprising the random sequence of intervening gateways.

19. The method of claim 16, further comprising, sending the data traffic received at the first gateway to the destination gateway via the random sequence of intervening gateways between the first gateway and the destination gateway.

20. The method of claim 16, wherein the flow ID is associated with a single data flow of a data session, and wherein the data session comprises a plurality of other data flows, each associated with different flow IDs.

21. A system for obscuring data flow paths, the system comprising:
a network of gateways, including an originating gateway and a destination gateway; and
a controller in communication with each gateway in the network of gateways;
wherein the originating gateway is configured to send to the controller a request for a flow path through the network of gateways from the originating gateway to the destination gateway;
wherein the controller is configured to:
compute, in response to the request, a unique flow path comprising a random sequence of intervening gateways between the originating gateway and the destination gateway, and
send, to each intervening gateway in the computed flow path, flow transformation information to enable each intervening gateway to forward received data traffic to the next intervening gateway in the random sequence; and
wherein each intervening gateway in the computed flow path is configured to, upon receiving the flow transformation information from the controller, transfer data traffic from the originating gateway to the destination gateway by forwarding it along each intervening gateway in the random sequence.

22. The system of claim 21, wherein each intervening gateway in the computed flow path is configured to gather network traffic statistics and to send the network traffic statistics to the controller, and wherein the controller is configured to compute the unique flow path based at least in part on the network traffic statistics.

23. The system of claim 21, wherein the request for the flow path is associated with a simulated traffic flow generated by the originating gateway.

24. The system of claim 23, wherein the originating gateway is configured to direct the simulated traffic flow at a network node hosting a network service or application in order to stress test the network node.

25. A system for obscuring data flow paths, the system comprising:
a network of gateways, including an originating gateway and a destination gateway; and
a controller in communication with each gateway in the network of gateways;
wherein the originating gateway is configured to split an original data flow into a plurality of micro-flows, and to send to the controller, for each micro-flow, a separate request for a different flow path through the network of gateways from the originating gateway to the destination gateway;
wherein the controller is configured to:
compute, in response to each request, a unique flow path for each micro-flow, the unique flow path comprising a random sequence of intervening gateways between the originating gateway and the destination gateway, and for each respective computed flow path:
send, to each intervening gateway in the respective computed flow path, flow transformation information to enable each intervening gateway to forward received data traffic to the next intervening gateway in the random sequence corresponding to the respective flow path; and wherein the destination gateway is configured to re-assemble micro-flows into the original data flow.

\* \* \* \* \*